(12) United States Patent
Corrado

(10) Patent No.: US 8,282,350 B2
(45) Date of Patent: Oct. 9, 2012

(54) METHOD AND APPARATUS FOR CAPTURING WIND TO PRODUCE ELECTRICAL POWER

(75) Inventor: Michael L. Corrado, Perkasie, PA (US)

(73) Assignee: The Corrado Family Limited Partnership, L.L.C., Perkasie, PA (US)

( * ) Notice: Subject to any disclaimer, the term of this patent is extended or adjusted under 35 U.S.C. 154(b) by 613 days.

(21) Appl. No.: 12/511,170

(22) Filed: Jul. 29, 2009

(65) Prior Publication Data

US 2011/0027079 A1 Feb. 3, 2011

(51) Int. Cl.
*F03D 3/06* (2006.01)

(52) U.S. Cl. .............. 416/1; 416/12; 416/24; 416/41; 416/117; 416/143; 416/197 A; 415/1; 415/4.2; 415/4.4; 415/907; 290/44; 290/55

(58) Field of Classification Search .............. 416/1, 9, 416/12, 17, 23, 24, 40, 41, 117, 142, 143, 416/197 R, 197 A; 415/1, 2.1, 4.1, 4.2, 4.4, 415/907; 290/44, 55
See application file for complete search history.

(56) References Cited

U.S. PATENT DOCUMENTS

| | | | | |
|---|---|---|---|---|
| 244,677 A | * | 7/1881 | Sherwood | 416/117 |
| 346,797 A | * | 8/1886 | Aylsworth | 416/117 |
| 354,972 A | * | 12/1886 | Dodds et al. | 416/118 |
| 713,094 A | * | 11/1902 | Grist | 416/118 |
| 1,413,339 A | * | 4/1922 | Leimi | 416/118 |
| 1,915,689 A | * | 6/1933 | Moore | 416/117 |
| 2,107,690 A | * | 2/1938 | Clark | 416/32 |
| 4,377,372 A | * | 3/1983 | Stutzman | 416/117 |
| 4,496,283 A | * | 1/1985 | Kodric | 416/44 |
| 4,818,180 A | * | 4/1989 | Liu | 416/117 |
| 5,570,997 A | * | 11/1996 | Pratt | 416/117 |
| 6,682,302 B2 | * | 1/2004 | Noble | 416/1 |

FOREIGN PATENT DOCUMENTS

| | | |
|---|---|---|
| JP | 2003-097412 A | 4/2003 |
| KR | 10-1990-0006678 A | 5/1990 |
| KR | 10-2005-0078802 A | 8/2005 |
| KR | 20-0440431 Y1 | 6/2008 |

OTHER PUBLICATIONS

PCT/US2010/038941, "Notifcation of Transmittal of the International Search Report and the Written Opinion of the International Searching Authority, or the Declaration" [1 sheet], mailling date Feb. 16, 2011.
PCT/US2010/038941, "International Search Report" [3 sheets], mailing date Feb. 16, 2011.
PCT/US2010/038941, "Written Opinion of the International Searching Authority" [4 sheets], mailing date Feb. 16, 2011.

* cited by examiner

*Primary Examiner* — Igor Kershteyn
(74) *Attorney, Agent, or Firm* — Beck & Thomas, P.C.

(57) ABSTRACT

A blade system and method of use for a wind turbine to produce electrical power. The system has a vertical rotor shaft coupled to an anchor pad and supports a horizontal blade arm. A blade assembly having a rotatable flap is coupled to the blade arm. The flap captures the wind which causes the rotor shaft to rotate and generates electrical power from an electrical generator.

13 Claims, 9 Drawing Sheets

METHOD AND APPARATUS FOR CAPTURING WIND TO PRODUCE ELECTRICAL POWER

CROSS-REFERENCES TO RELATED APPLICATIONS

None.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

1. Field of the Invention

The present invention is related to a blade system for use in a wind turbine in which the wind rotates a rotor shall to a generator that produces electrical energy. The blade system has a blade arm with blade assemblies that have rotatable flaps.

2. Description of Related Art

The amount of kinetic energy that can be harvested for the production of electricity is a function of wind velocity, surface area and efficiency of the blade system. The current propeller-type wind turbines harvest most of the wind energy today. The blades are 35 meters in length and currently newer turbines will use blades of 42 meters in length. There are two fundamental problems with the propeller design.

First, the propeller design has a natural tendency to "fly" in a direct line just as a plane would fly. The ability to harness the blades to the pole is easily maintained in winds below 50 miles per hour. Winds above this, however, could cause the blades to fly off the pole. For this reason the design for wind turbines must be "furled" or "battened down" in these high winds. Yet it is these high winds that process the greatest kinetic energy since the wind velocity cubed ($V^3$) determines the energy harvest. As an example, a wind velocity of 50 miles per hour does not contain twice the energy as a 25 mile per hour wind but rather ($50^3 + 25^3$) eight times as much.

The second problem with the current propeller design is that such propeller-type units must face into the wind. If the unit fails to rotate into the wind the electrical harvest will drop enormously and possibly to zero. Finally, while not an issue of generation, the propeller designs kill migratory birds. For these reasons the horizontal designs have been considered. In a horizontal design the unit spins on an access horizontal to the earth's surface rather than perpendicularly as propeller designs do.

Horizontal units, however, have their own problems. The first problem is that the horizontal units are top heavy. For this reason they are very small and most suited for homes and office units but not for the primary energy of electrical energy grid. A second problem is inefficiency due to drag. If the blades are flat the same wind hits the left blade as hits the right blade resulting in no movement. In order to reduce drag the blades are in a fixed pitched position; the blade being "pushed" by the wind is in a fixed pitched position so that more surface faces the wind while the trailing blade moving into the wind and not with the wind is in a fixed pitched position so that it leads into the wind on edge.

While this does allow directional movement there is drag and inefficiency which still remains significant. The horizontal design does, however, work without ever having to turn into the wind as does the propeller design.

BRIEF SUMMARY OF THE INVENTION

The invention offers a horizontal design which has traditional horizontal advantages but in addition offers a massive surface area which can be created while at the same time reducing drag by a rotatable flap system which is rotatably supported on horizontal blade arms. The invention increases the ability to move the leading face of a flap, namely, the windblown face and by decreasing the wind resistance of the trailing face of the flap.

One can improve rotational speed by increasing the "pushed" surface or decrease the "trailing" surface (drag). The invention does both at the same time using an aerodynamic approach that is positive and unique to wind turbines.

The trailing blade moving into the wind undergoes passive conformational positioning leading to optimized aerodynamics in a partially reduced angle of the blade thereby decreasing drag. In similar fashion, as this blade rotates into the position pushed by the wind, the passive process produces an increased angle configuration leading to maximized surface access to the wind and therefore increased wind harvest.

The invention provides a method and structure for capturing wind using a blade system to rotate a shaft coupled to a rotor shaft of a generator to produce electrical energy from the wind energy. The invention provides a blade system to implement the method to capture wind to generate electrical power.

The method and system use arms with flaps which enable a single turbine system to yield enormous amounts of electricity even in a relatively low wind environment. The blade arms are constructed with a male-female system in which the blade arms with flaps open passively in the leading positions and close passively in the wind trailing position so as to maximize wind harvest and reduce wind drag. A rotor shaft drives a turbine located potentially in a number of various locations including the base either as a single generator or as a series of generators. As a consequence of constructed size and passive flap opening action a single such constructed wind turbine can increase the surface area enormously and yield electricity from four to forty fold more than the current largest wind turbines. When used in an off shore setting these turbines are anchored at sea bed by a series of underwater construction which also serve as an artificial reef to improve marine habitants and echo systems.

I provide a blade system for use in a wind turbine to produce electrical power having: an anchor pad; a substantially vertical rotor shaft having a bottom, the bottom is rotatably coupled to the anchor pad; a substantially horizontal blade arm support by the rotor shaft; and a blade assembly having a rotatable flap capable of opening and closing to provide an open position and a closed position, the blade assembly coupled to the blade arm. A support pole is coupled to the blade arm and supports the blade arm. The support pole has a bottom and spaced radially from the rotor shaft. A track surrounds the rotor shaft and a track device is moveably coupled to the track and has the bottom end of the support pole coupled to the track device.

A rotatable cooperating flap is coupled to the blade assembly in which the flap and the cooperating flap form an open position when the flap is in the open position and in which the flap and cooperating flap form a closed position when the flap is in the closed position.

The blade arm is structured with multiple blade arm segments which have a male-female coupling configuration to join adjacent blade arm segments.

In another embodiment the support pole that is coupled to the blade arm in supporting the blade arm has a bottom end coupled to an area where the bottom of the rotor shaft is rotatably coupled to the anchor pad. A track surrounds the rotor shaft. A track device is moveably coupled to the track and the bottom end of the support pole is coupled to the track device.

The blade system includes a plurality of blade assemblies on the blade arm. The blade assembly is removeably coupled to the blade arm.

In another embodiment a plurality of blade arms are supported by the rotor shaft at different vertical levels along the vertical rotor shaft and each blade arm has a blade assembly.

In another embodiment there is a plurality of blade arms each having a blade assembly and supported by the rotor shaft at a same vertical level on the rotor shaft.

The blade arm has a wedge shape cross section and the blade assembly has a body having an inner opening shape conforming to the wedge shape cross section of the blade arm. The blade assembly body is removeably fitted over the blade arm.

I provide a method for capturing wind forces to rotate a rotor shaft of a wind turbine to produce electrical power in which I provide a substantially vertical rotor shaft having a bottom end that is rotatably coupled to an anchor pad; a substantially horizontal blade arm that is joined to the rotor shaft that vertically supports the blade arm. I provide a blade assembly that is coupled to the blade arm and has a rotatable flap, the flap having a leading face and an opposite trailing face so that when the flap is in an open position the wind engages the leading face and pushes against the leading face causing the face to move with the wind and rotate the rotor shaft in a certain direction. As the rotor rotates, the blade arm and blade assembly move to a position where the wind pushes against the trailing face of the flaps. This causes the flap to go to a closed position that reduces drag on the blade arm.

I provide a support pole coupled to the blade arm to provide a vertical support to the blade arm and a track surrounding the rotor shaft and a track device moveably coupled within the track in which one end of the support pole is coupled to the track device so that when the rotor shaft rotates and the blade arm moves with the rotor shaft the support pole moves along the track and around the rotor shaft and maintains vertical support to the blade arm.

I provide a rotatable flap and a cooperating flap coupled to the blade assembly in which the flap and cooperating flap have leading faces and opposite trailing faces. The leading faces of the flap and cooperating flap form an open position when the flap is in an open position. The open position formed by the flap and the cooperating flap captures wind pushing against the leading faces of the flap and cooperating flap. When the wind contacts the trailing faces of the flap and the cooperating flap, the open position formed by the flap and the cooperating flap is collapsed by the wind causing the leading face of the flap and the leading face of the cooperating flap to close toward each other thereby reducing drag on the blade arm.

I provide in the method that the blade arm comprises blade arm segments that have male-female coupling configuration to join adjacent blade arm segments.

In another embodiment I provide that a support pole having a bottom end moveably coupled to an area where the bottom of the rotor shaft is rotatably coupled to the anchor pad.

DETAILED DESCRIPTION OF THE PREFERRED EMBODIMENT

The Structure

Figure 1:
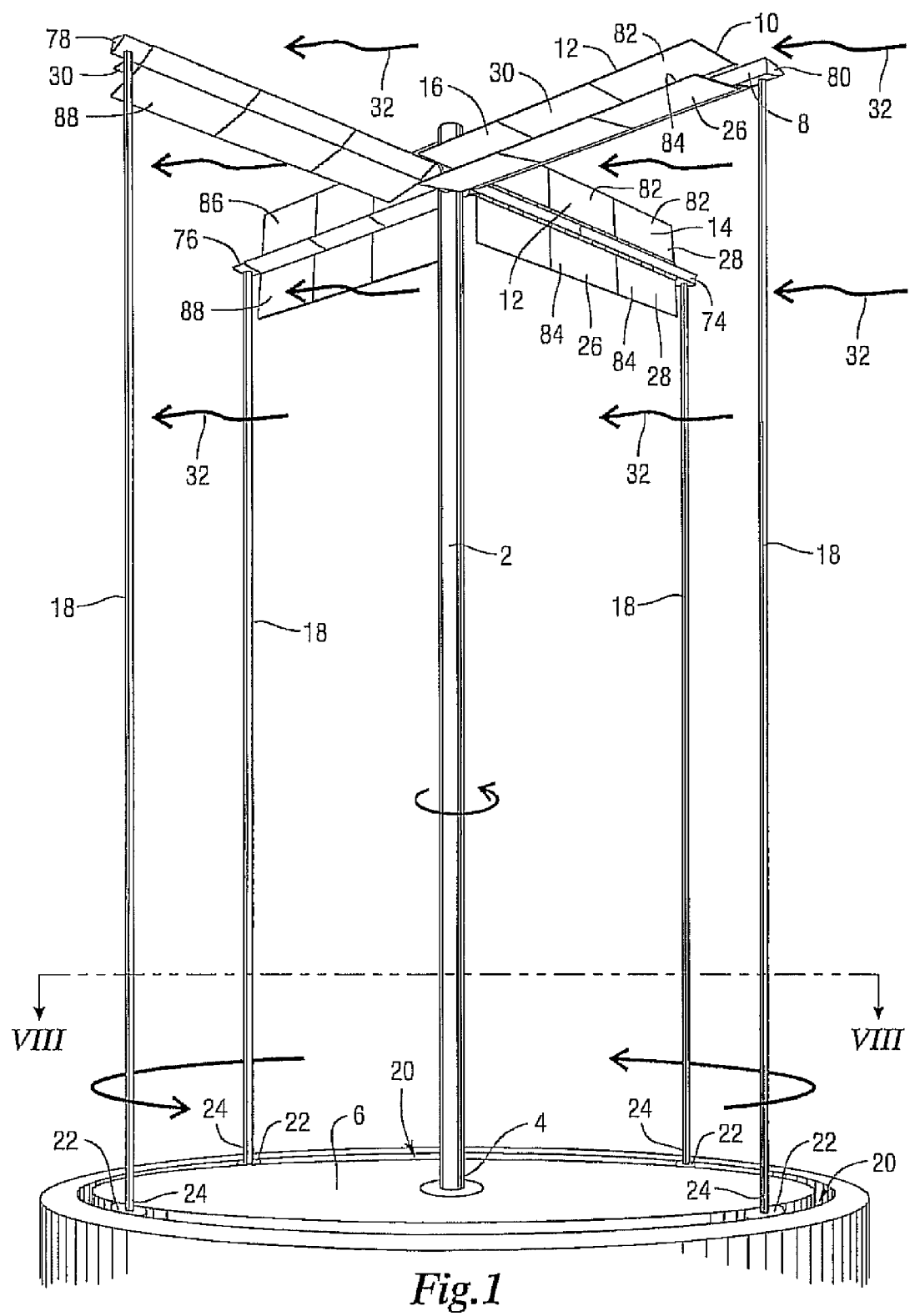
FIG. 1 is an isometric view of the blade system showing four horizontal blade arms with blade assemblies at the same vertical level on a rotor shaft with support poles supporting the blade arms and the wind approaching right to left and causing the rotor shaft to rotate in a counterclockwise direction.

FIG. 1 shows a blade system for use in a wind turbine to produce electrical power. A substantially vertical rotor shaft 2 having a rotor shaft bottom 4 is rotatably coupled to anchor pad 6 at the rotor shaft bottom 4. A substantially horizontal blade arm 8 is supported by the rotor shaft 2. A blade assembly 10 has a rotatable flap 12 capable of opening and closing to provide an open position 14 and a closed position 16 and is rotatably coupled to the blade assembly 10. A support pole 18 is coupled to the blade arm 8 and vertically supports the blade arm 8. A track 20 surrounds the rotor shaft 2. A track device 22 is movably coupled to the track 20. A bottom end 24 of the support pole 18 is coupled to the track device 22. The bottom end 24 of support pole 18 is spaced radially from the rotor shaft 2.

A rotatable cooperating flap 26 is rotatably coupled to the blade assembly 10. The flap 12 and the cooperating flap 26 form an open position 28 when the flap 12 is in the open position 14. The flap 12 and the cooperating flap 26 form a closed position 30 when the flap 12 is in the closed position 16.

The wind 32 as seen approaching right to left in FIG. 1 causes the flap 12 and cooperating flap 26 to move in an open position 28. The force of the wind 32 pushes the flap 12 and the cooperating flap 26 and causes the rotor shaft 2 to rotate in a counterclockwise position and moves the support pole 18 which moves in the track 20 in a counterclockwise position.

Figure 2:
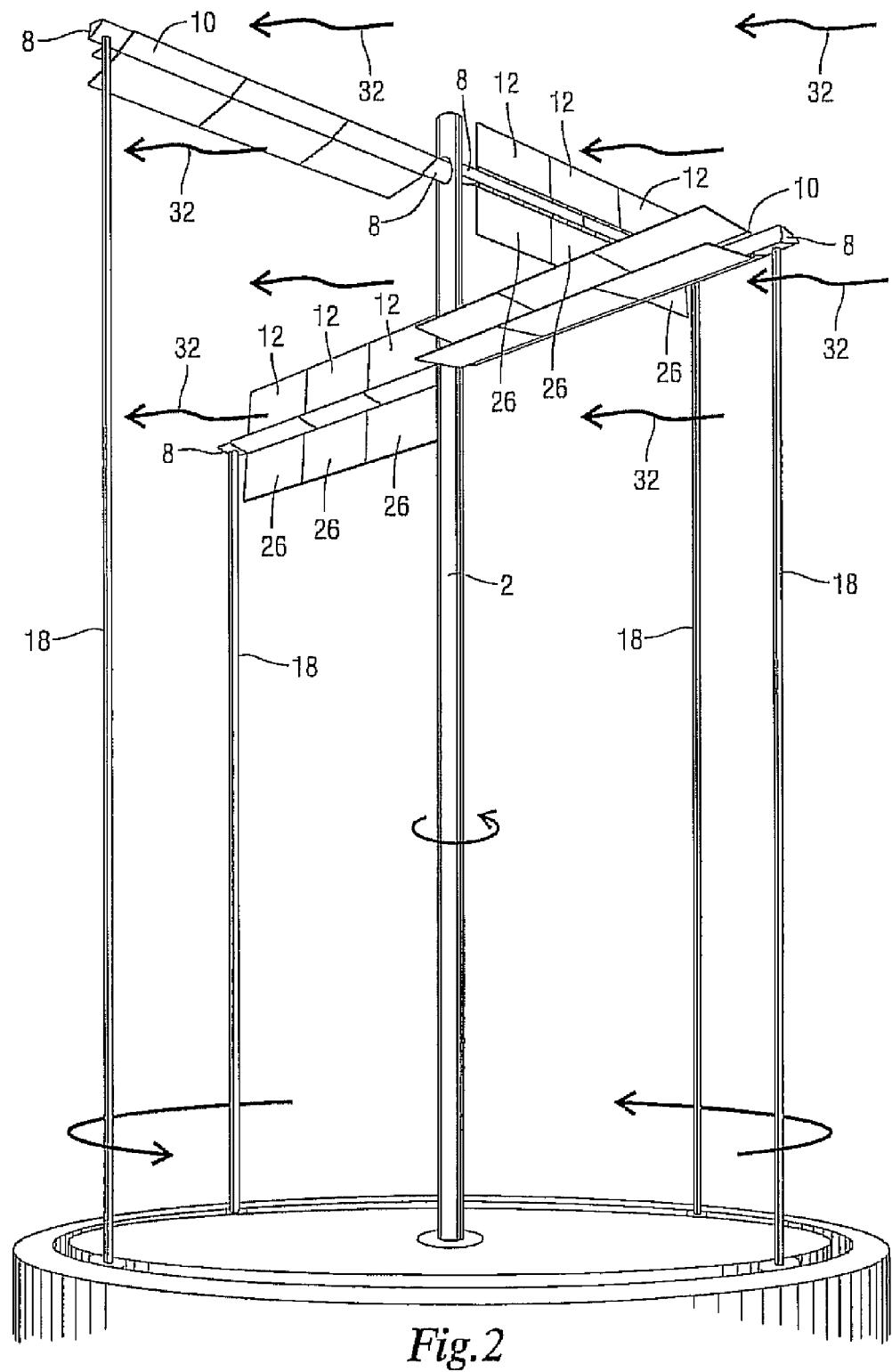
FIG. 2 is an isometric view of the blade system showing four horizontal blade arms with blade assemblies at two different vertical levels on a rotor shaft with support poles supporting the blade arms and the wind approaching right to left and causing the rotor shaft to rotate in a counterclockwise direction.

FIG. 2 is another embodiment showing blade arms 8 having blade assemblies 10 having rotatable flaps 12 and cooperating flaps 26. Each blade assembly 10 has a flap 12 and cooperating flap 26 coupled to it. There is a plurality of blade assemblies on each blade arm 8. The advantage of having multiple blade assemblies 10 on each blade arm 8 is that if a flap 12 or cooperating flap 26 or a blade assembly 10 are damaged only that particular blade assembly 10 needs to be removed from the blade arm 8 and the cost factor is significantly reduced as opposed to replacing longer single blade assemblies with flaps covering the entire length of the blade arm. It is less costly because less material is used and also the removal of the damaged assembly and the replacement of the new assembly are easier because of its smaller size.

The blade arms 8 are shown in two groups. Each group has two blade arms 8. The blade arms 8 in each group are at the same vertical level. Each of the two groups is on a different vertical level.

Figure 3:
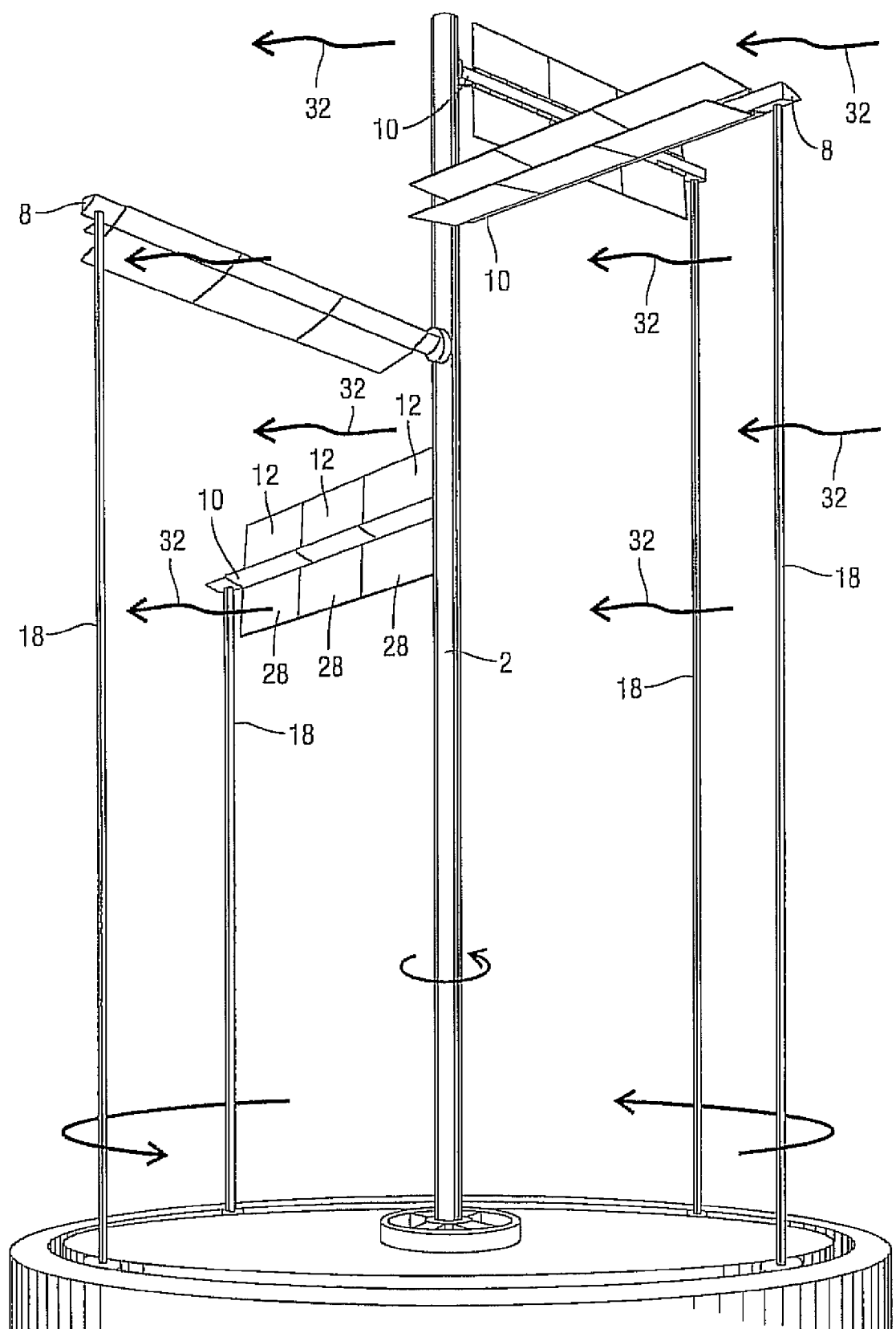
FIG. 3 is an isometric view of four blade arms with blade assemblies each at a different vertical level on a rotor shaft with support poles supporting the blade arms and the wind approaching from right to left causing the rotor shaft to rotate in a counterclockwise direction.

FIG. 3 shows another embodiment. A plurality of blade arms 8 with associated blade assemblies 10 having flaps 12 and cooperating flaps 26 are positioned at various angles extending from the rotor shaft 2 and at different vertical heights along the vertical length of the rotor shaft 2.

Figure 4:
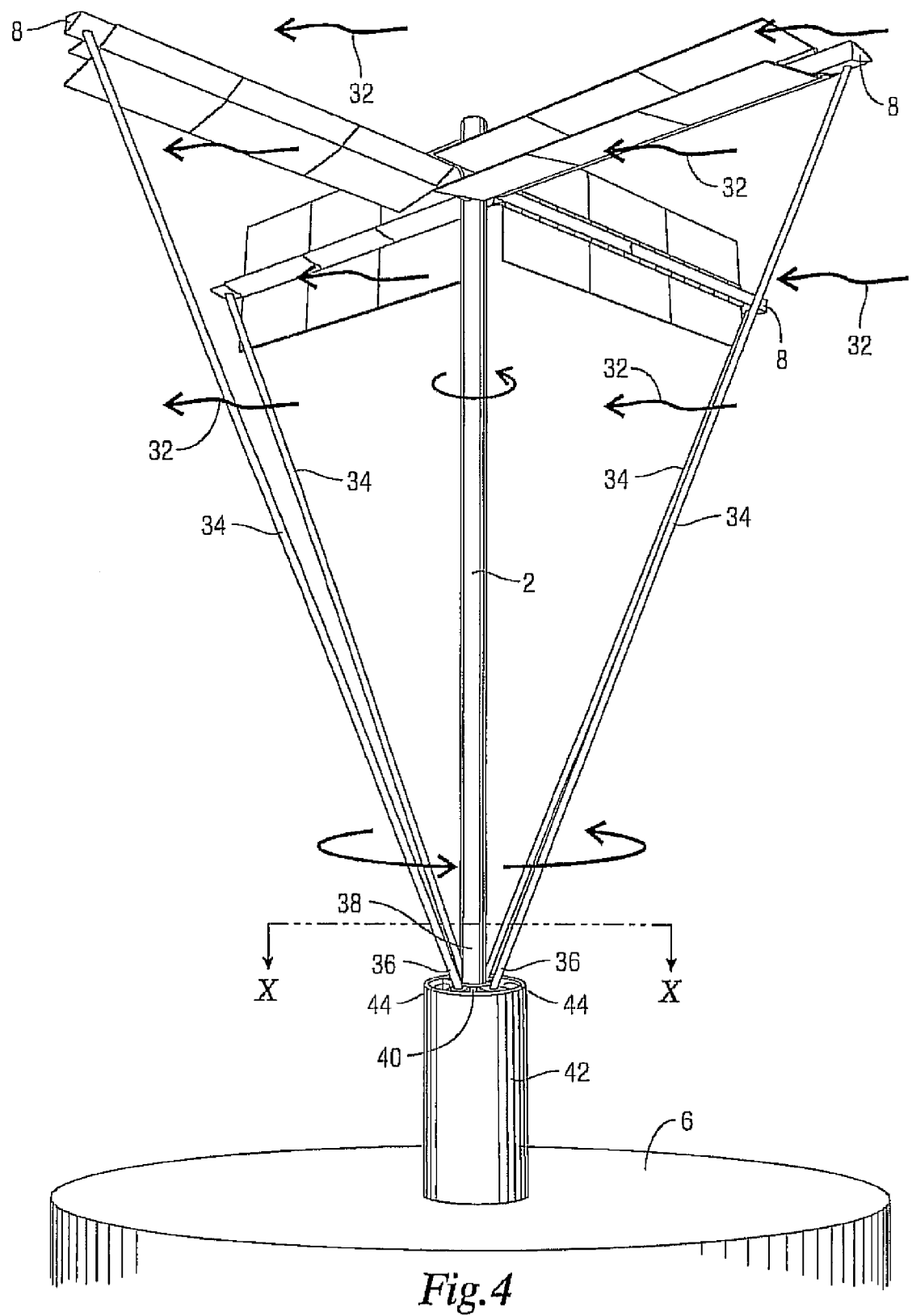
FIG. 4 is an isometric view of another embodiment of that shown in FIG. 1 showing the support poles moveably coupled in the same area where the bottom of the rotor shaft is rotatably coupled to the anchor pad.

FIG. 4 is another embodiment showing angled support poles 34 which extend at an angle from the blade arm 8 to a bottom 36 of the angled support pole 34. The bottom 36 of the angled support pole 34 is coupled to an area 38 where the rotor shaft 2 is rotatably coupled to the anchor pad 6 within the mount 42 which is joined to the anchor pad 6. The rotor shaft 2 is rotatably coupled within the mount 42 by suitable bearings. Within the mount 42 and surrounding the rotor shaft 2 is a track 40 which surrounds the rotor shaft 2. A track device 44 is movably coupled to the track 40. The bottom 36 of the angled support pole 34 is connected to the track device 44 within the track 40. Whenever the rotor shaft 2 rotates the blade arm 8 moves and the angled support poles 34 also move within the track 40.

Figure 6:
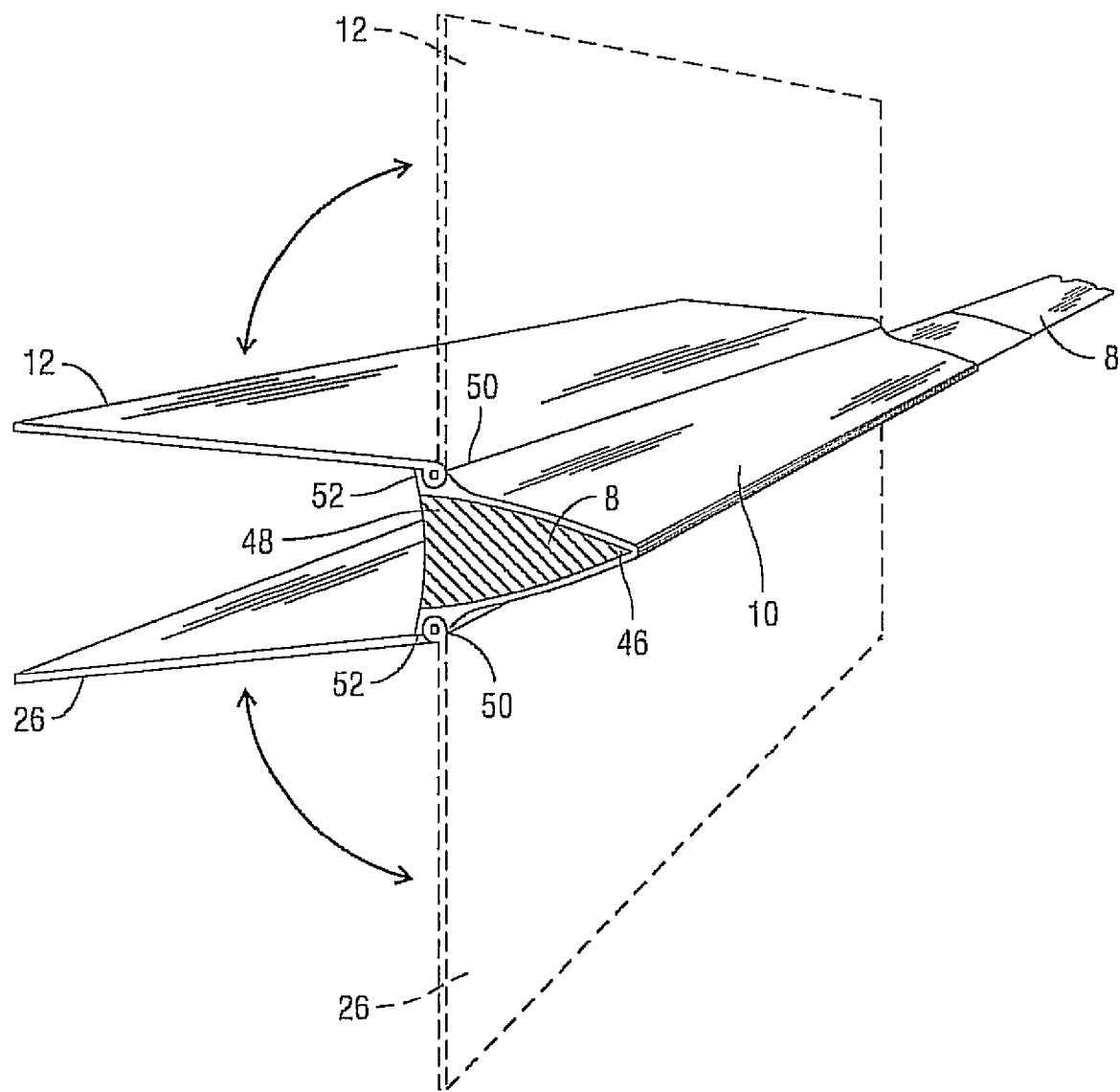
FIG. 6 is an isometric view showing a blade assembly having a rotatable flap and rotatable cooperating flap coupled to a blade arm in which the flap and the cooperating flap are shown in a closed position and in chain line showing the movement of the flap and cooperating flap to an open position.

FIG. 6 shows a blade arm 8 that has a wedge shape cross section. The wedge shape has an apex point 46 and a base 48. Surrounding the outside surface of the wedge shape cross section of the blade arm 8 is a corresponding open portion of a blade assembly 10 which conforms to the outer shape of the blade arm 8 having the wedge shape cross section. The blade assembly 10 has a flap 12 and a cooperating flap 26. The blade assembly 10 has a vertical stop 50 and a horizontal stop 52. The purpose of the vertical stop 50 is to stop the flaps 12 and cooperating flap 26 from moving beyond a vertical position as shown in the chain lines from a horizontal position shown in solid lines. The blade assembly 10 also has the horizontal stops 52 which prevent the flap 12 and the cooperating flap 26 from moving beyond the substantially horizontal position shown in solid lines from the vertical position shown in chain lines.

Figure 7:
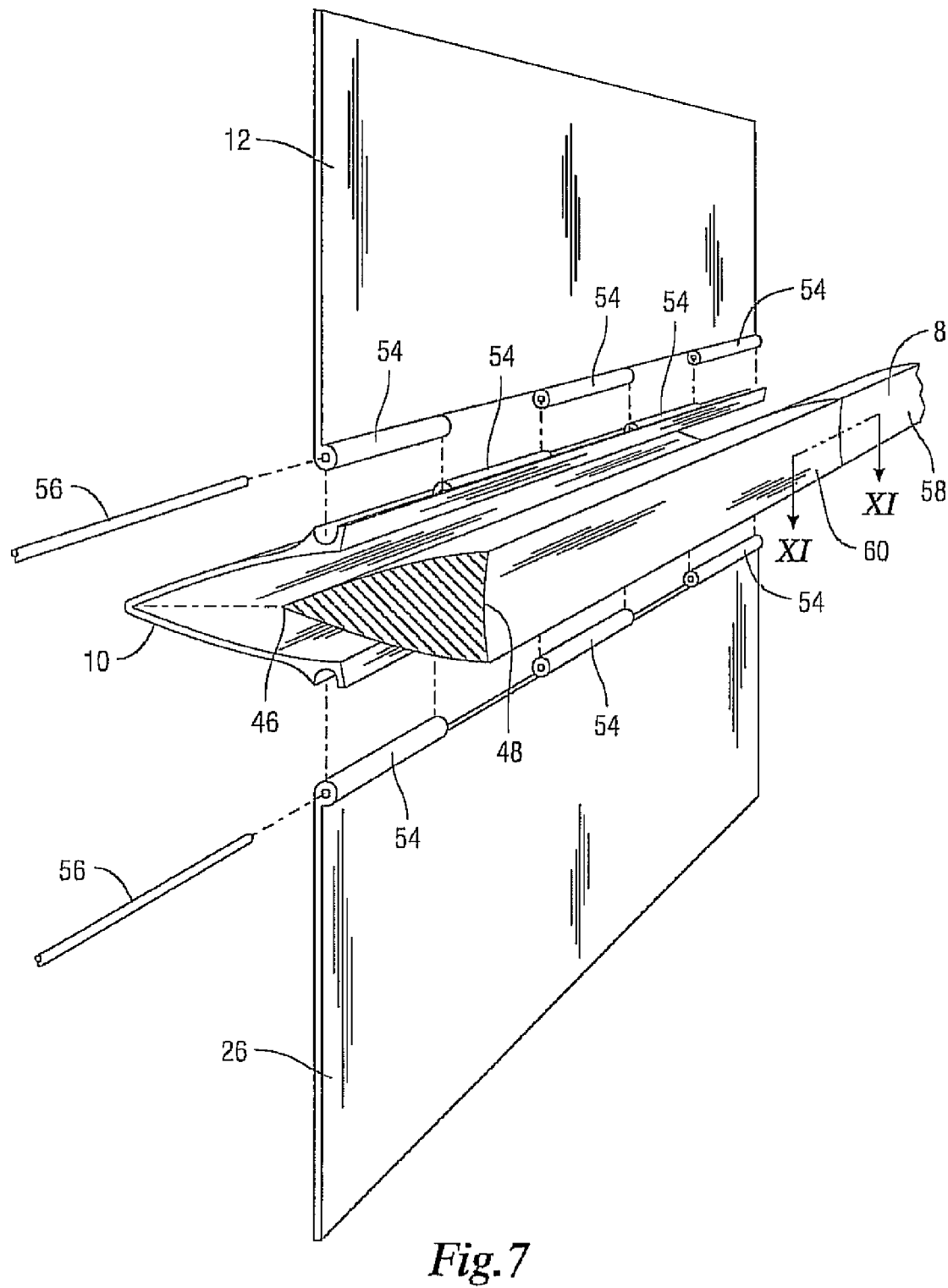
FIG. 7 is an exploded isometric view of a blade assembly with flap and cooperating flap with blade arm.

FIG. 7 is an exploded isometric view of the blade arm 8 with the blade assembly 10, flap 12 and the cooperating flap 26. The blade arm 8 has a cross section of a wedge shape with a base 48 and an apex point 46. The blade assembly 10 has a body having an inner open shape which conforms to the wedge shape cross section of blade arm 8 and is press fitted over the blade arm 8. The body of the blade arm assembly 10 can be removed from the wedge shape of the blade arm 8. The purpose of this is to enable blade assemblies 10 to be removed from the blade arm 8 and new blade assemblies 10 inserted in the event that there is damage of any portion of the blade assembly 10 including the flaps 12 and cooperating flaps 26 that are a part of the blade assembly 10. The flap 12 and the cooperating flap 26 and the body of the blade assembly 10 have pivot segments 54. A pivot pin 56 is inserted through the pivot segments 54 holding the flap 12 and cooperating flap 26 in position and enabling the flap 12 and cooperating flap 26 to rotate between approximately a horizontal position and a vertical position as shown in FIG. 6.

Figure 11:
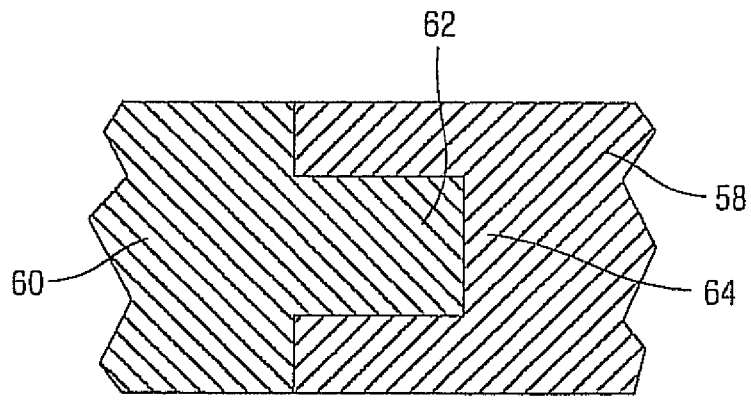
FIG. 11 is a sectional view of FIG. 7 of the blade arm taken along the line XI-XI.

The blade arm 8 comprises multiple segments 58 and 60. These segments 58 and 60 are shown in FIG. 11 in which they are joined together by a male member 62 on segment 60 that is inserted into female portion 64 of segment 58. This enables a simpler construction and repair of the blade arm 8.

Figure 8:
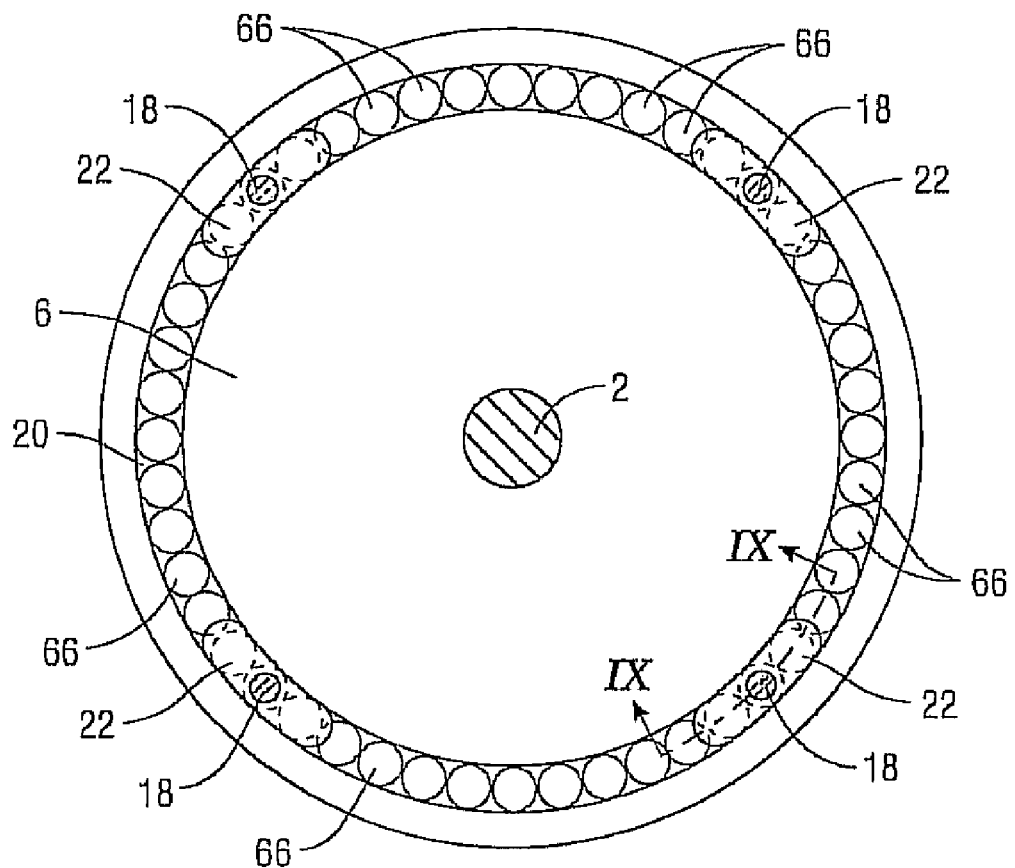
FIG. 8 is a sectional view of FIG. 1 along the line VIII-VIII.

FIG. 8 shows a cross section of FIG. 1 taken along the line VIII-VIII of FIG. 1 and shows the track 20, with bearings 66 and inserted within the anchor pad 6 with the rotor shaft 2 and the support poles 18.

Figure 9:
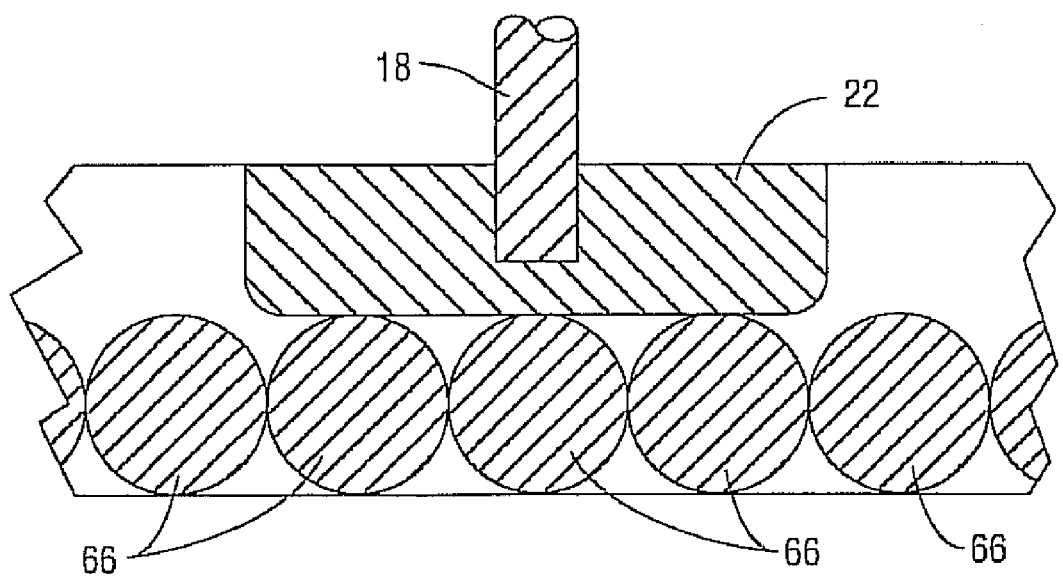
FIG. 9 is a sectional view of FIG. 8 along the line IX-IX.

FIG. 9 is a sectional view of the FIG. 8 taken along the line IX-IX of FIG. 8 showing support pole 18 mounted on a track device 22 supported by bearings 66. This enables the support pole 18 to move within the track 20 as the rotor shaft 2 shown in FIG. 8 rotates and causes the blade arms 8 to move carrying the support poles 18 with it and enable the support poles 18 to move with the rotation of the rotor shaft 2.

Figure 10:
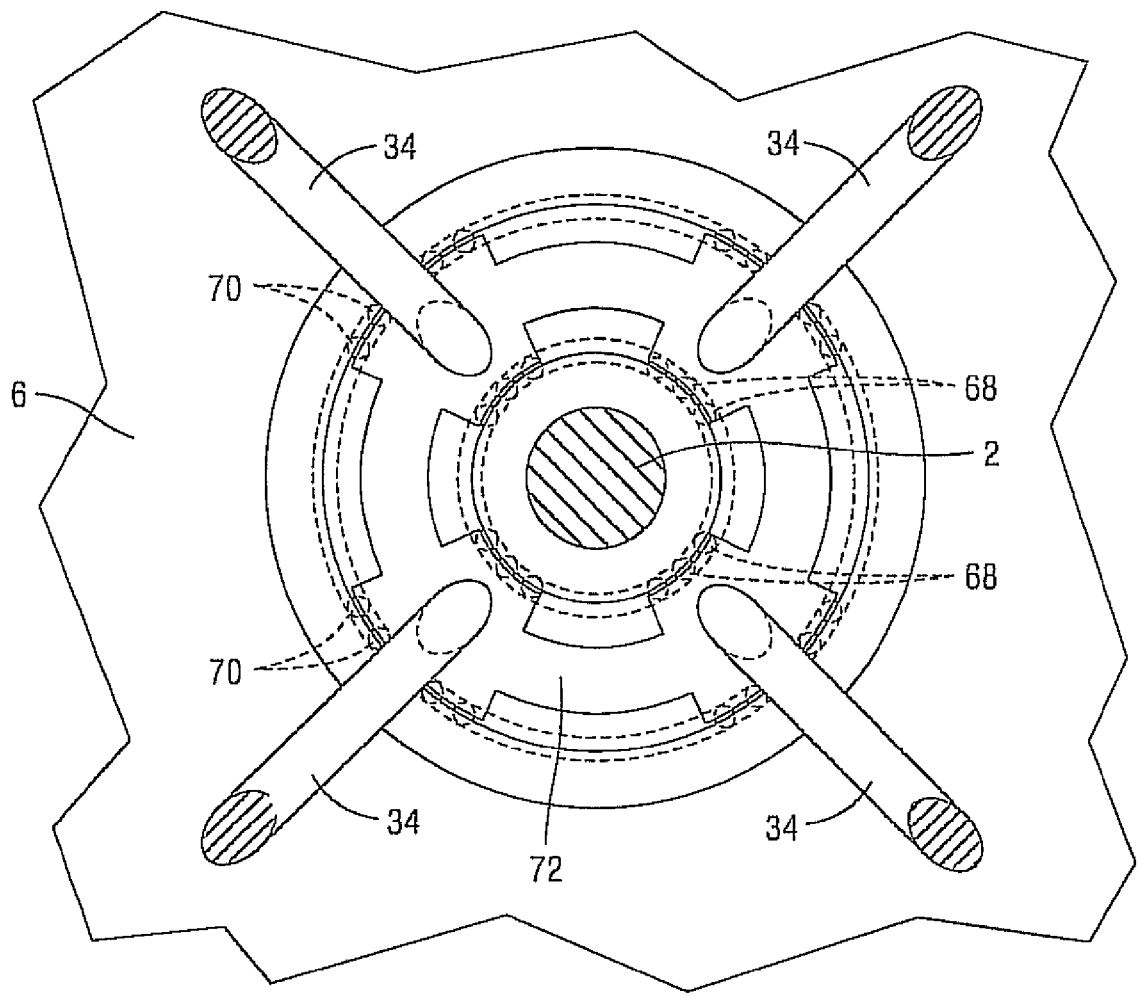
FIG. 10 is a sectional view of FIG. 4 taken along the line X-X.

FIG. 10 shows the configuration shown in the FIG. 4 taken across the line X-X. It shows the anchor pad 6, the mount 42, the angled support poles 34 and the rotor shaft 2 that is supported with an assembly having bearings 68 that enable the rotor shaft 2 to rotate within the mount 42. Bearings 70 within the mount 42 in combination with plate 72 to which the support poles 34 are joined enable the support poles 34 to move within the mount 42.

Method and Function of the Structure to Capture Wind Forces to Rotate a Rotor Shaft of a Wind Turbine to Produce Electrical Power The following is a description of the operation of the blade system and method for capturing wind forces to rotate a rotor shaft of wind turbine to produce electrical power.

Referring to FIG. 1 the wind 32 is moving right to left. FIG. 1 shows four separate blade arms 8 attached to the rotor shaft 2. Each blade arm 8 has a plurality of blade assemblies 10. Each blade assembly 10 has a flap 12 which is rotatable back and forth from a substantially horizontal position to a substantially vertical position. Each blade assembly 10 can have a cooperating flap 26. The system will work without the cooperating flap 26. When the flap 12 and the cooperating flap 26 are in the vertical positions they are in what is known as an open position 28. When the flap 12 and the cooperating flap 26 are in a substantially horizontal position they are considered to be in a closed position 30. The four separate blade arms 8 will be referred to going counterclockwise starting with the first blade arm 74 and going counterclockwise around from right to left. The first blade arm 74 follows the second blade arm 76; the second blade arm 76 follows the third blade arm 78; the third blade arm 78 follows the fourth blade arm 80 and the fourth blade arm 80 follows the first blade arm 74. The wind 32 will strike the first blade arm 74 and contact all of the leading faces 82 of the flaps 12 and causes the flaps 12 to move into a vertical position. The wind 32 will also contact the leading faces 84 of the cooperating flaps 26 and cause the cooperating flaps 26 to move into a vertical position as shown. The flaps 12 and cooperating flaps 26 will be in an open position 28.

Each of the rotatable flaps 12 have in addition to a leading face 82 shown on the first blade arm 74 an opposite trailing face 86 as is shown on the blade assembly 10 on the second blade arm 76.

Each of the cooperating flaps 26 have in addition to a leading face 84 as shown on the first blade arm 74 an opposite trailing face 88 as shown on the second blade arm 76.

The flaps 12 and cooperating flaps 26 on the first blade arm 74 and the second blade arm 76 are shown in an open position 28. This open position 28 and the wind 32 striking the vertical flaps 12 and vertical cooperating flaps 26 causes a counterclockwise rotation of the rotor shaft 2 which in turn rotates a shaft not shown for an electrical generator not shown and generates electrical energy.

The third blade arm 78 shows the wind 32 striking the trailing face 86 of flap 12 and the trailing face of the cooperating flap 26 and causes the leading face 82 of the flap 12 and the leading face 84 of the cooperating flap 26 to close toward each other resulting in a closed position 30. This reduces drag on the third blade arm 78 that is moving into the wind 32 that contacts the trailing face 86 of the flap 12 and the trailing face 88 of the cooperating flap 26. This causes the open position 28 of the flap 12 and cooperating flap 14 to collapse because the trailing face 86 of flap 12 and the trailing face 88 of cooperating flap 26 are coming into the wind. This closed position 30 formed by the flap 12 and the cooperating flap 28 reduces drag on the third blade arm 78 facing into the wind 32 as the rotor shaft 2 carrying the blade arm 76 is rotated counterclockwise into the wind.

The fourth blade arm 80 is shown with its flap 12 and cooperating flap 26 in a closed position 30. As blade arm 8 continues to move in a counterclockwise position the wind 32 will contact the leading faces 82 of the flaps 12 and the leading faces 84 of the cooperating flaps 26 causing those flaps 12 and 26 to move into an open position 28 as shown in the first blade arm 74 and the cycle will repeat as the first blade arm 74 moves to the position where the second blade arm 76 is shown and the second blade arm 76 moves to the position where the third blade arm 78 is located and the third blade arm 78 moves into the position where the fourth blade arm 80 is located.

Figure 5:
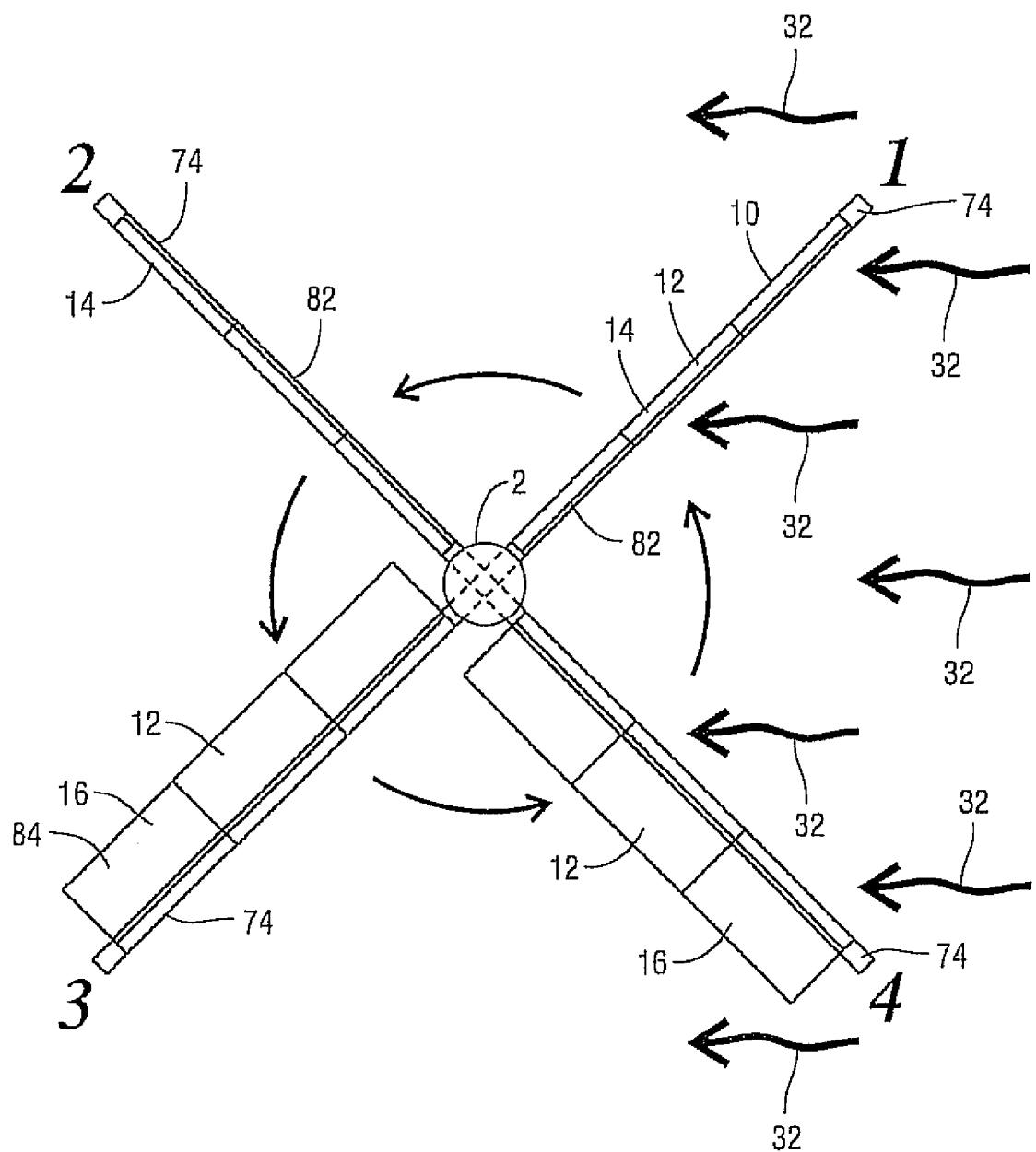
FIG. 5 is a top plan view showing a schematic of four sequencing positions of a single blade arm with blade assembly showing positions of the flaps on the blade assembly as it is moved counterclockwise by the wind approaching right to left.

FIG. 5 shows a plan schematic view of the wind 32 moving right to left. The schematic shows a rotation of the four different positions (1)-(4) of the first blade arm 74 that is shown in FIG. 1. It shows the first blade arm 74 with the first blade assemblies 10 and the flap 12 in which the blade arm 74 is attached and carried by the rotor shaft 2. When the first blade arm 74 is at position (1) the wind 32 is moving the first blade arm 74 and the flap 12 is in an open position 14 and the first blade arm 74 is rotated counterclockwise to position (2) and the flap 12 is still in the open position 14 and the wind 32 contacting the flap 12 continues to move the blade arm 74 in a counterclockwise position to position (3).

Whenever the first blade arm 74 moves into the position (3) the flap 12 is moved towards a horizontal position in which the wind 32 contacts the trailing face 86 of the flap 12 causing the flap 12 to rotate into a closed position 16. This reduces drag on the first blade arm 74 coming counterclockwise into the wind 32. The closed position 16 of flap 12 is maintained at position (4) and is maintained until the wind 32 comes into and approaches position (1) at which the wind 32 contacts the leading face 82 of the flap 12 causing the flap 12 to rotate to a vertical and open position 14 so it can present a large surface area to the wind 32 to move the arm 74 into the wind and repeat the cycle. This causes the rotor shaft 2 to rotate and generate electrical power.

This arrangement will work regardless of the direction of the wind 32. The ability of the device to turn and produce electricity is independent of wind direction and changes in wind direction whether those changes are from day to day or minute to minute. This is an advantage over the vertical propeller type blades because the whole system must be turned into the wind. There's enormous weight involved in vertical propeller type system. This invention has flaps rotating over a direction of approximately 90 degrees. The flaps are smaller weighted parts and they are in segments.

Various changes can be made to the above construction method without departing from the scope of the invention as defined in the claims below. It is intended that all matter contained in the above description as shown in the accompanying drawings shall be interpreted as illustrative and not as a limitation.

I claim:

1. A blade system for use in a wind turbine to produce electrical power comprising:
   a. an anchor pad;
   b. a substantially vertical rotor shaft having a bottom, the bottom rotatably coupled to the anchor pad;
   c. a substantially horizontal blade arm supported by the rotor shaft, the blade arm has a wedge shape cross section; and
   d. a blade assembly having a rotatable flap capable of opening and closing to provide an open position and a closed position, the blade assembly has a body having an inner open shape conforming to the wedge shape cross section of the blade arm and the blade assembly body is removably fitted and coupled to the blade arm.

2. A blade system for use in a wind turbine to produce electrical power as recited in claim 1 including:
   a. a support pole coupled to the blade arm and supporting the blade arm, the support pole having a bottom end and spaced radially from the rotor shaft;
   b. a track surrounding the rotor shaft; and
   c. a track device moveably coupled to the track, the bottom end of the support pole coupled to the track device.

3. A blade system for use in a wind turbine to produce electrical power as recited in claim 1 including a rotatable cooperating flap coupled to the blade assembly in which the flap and the cooperating flap form an open position when the flap is in the open position and in which the flap and the cooperating flap form a closed position when the flap is in the closed position.

4. A blade system for use in a wind turbine to produce electrical power as recited in claim 1 wherein the blade arm comprises blade arm segments which have a male-female coupling configuration to join adjacent blade arm segments.

5. A blade system for use in a wind turbine to produce electrical power as recited in claim 1 including:
   a. a support pole coupled to the blade arm and supporting the blade arm, the support pole having a bottom end rotatably coupled to an area where the bottom of the rotor shaft is rotatably coupled to the anchor pad;
   b. a track surrounding the rotor shaft; and
   c. a track device moveably coupled to the track, the bottom end of the support pole coupled to the track device.

6. A blade system for use in a wind turbine to produce electrical power as recited in claim 1 including a plurality of blade assemblies on the blade arm.

7. A blade system for use in a wind turbine to produce electrical power as recited in claim 1 has a plurality of blade arms supported by the rotor shaft at different vertical levels along the vertical rotor shaft and each blade arm having a blade assembly.

8. A blade system for use in a wind turbine to produce electrical power as recited in claim 1 has plurality of blade arms each having a blade assembly and supported by the rotor shaft at a same vertical level on the vertical rotor shaft.

9. A method for capturing wind forces to rotate a rotor shaft of a wind turbine to produce electrical power comprising:
  a. providing a substantially vertical rotor shaft having a bottom end that is rotatably coupled to an anchor pad;
  b. providing a substantially horizontal blade arm that is joined to the rotor shaft that vertically supports the blade arm, the blade arm has a wedge shape cross section; and
  c. providing a blade assembly that has a body having an inner open shape conforming to the wedge shape cross section of the blade arm and the blade assembly body is removably fitted and coupled to the blade arm and has a rotatable flap, the flap having a leading face and an opposite trailing face so that when the flap is in an open position the wind engages the leading face and pushes against the leading face causing the flap to move with the wind and rotate the rotor shaft in a certain direction and as the rotor shaft rotates, the blade arm and blade assembly move to a position where the wind pushes against the trailing face of the flap causing the flap to go to a closed position that reduces drag on the blade arm.

10. A method for capturing wind forces to rotate a rotor shaft of a wind turbine to produce electrical power as recited in claim 9 including:
  a. providing a support pole coupled to the blade arm to provide vertical support to the blade arm;
  b. providing a track surrounding the rotor shaft; and
  c. providing a track device moveably coupled within the track in which one end of the support pole is coupled to the track device so that when the rotor shaft rotates and the blade arm rotates with the rotor shaft the support pole moves along the track and around the rotor shaft and maintains vertical support to the blade arm.

11. A method for capturing wind forces to rotate a rotor shaft of a wind turbine to produce electrical power as recited in claim 9 including providing a rotatable cooperating flap coupled to the blade assembly in which the cooperating flap has a leading face and an opposite trailing face, the leading face of the cooperating flap and the leading face of the flap form an open position when the flap is in an open position and the open position formed by the flap and cooperating clap captures wind pushing against the leading face of the flap and cooperating flap and when the wind contacts the trailing face of the flap and the trailing face of the cooperating flap, the open position formed by the flap and cooperating flap is collapsed by the wind causing the leading face of the flap and leading face of the cooperating flap to close toward each other thereby reducing drag on the blade arm.

12. A method for capturing wind forces to rotate a rotor shaft of a wind turbine to produce electrical power as recited in claim 9 wherein the blade arm comprises blade arm segments which have a male-female coupling configuration to join adjacent blade arm segments.

13. A method for capturing wind forces to rotate a rotor shaft of a wind turbine to produce electrical power as recited in claim 9 including providing a support pole coupled to the blade arm to provide vertical support to the blade arm, the support pole having a bottom end rotatably coupled to an area where the bottom of the rotor shaft is rotatably coupled to the anchor pad.

* * * * *